United States Patent [19]

Speer

[11] Patent Number: 4,901,896

[45] Date of Patent: Feb. 20, 1990

[54] APPARATUS FOR CONNECTING ARTICLE CARRIERS TO A TRAILER HITCH BALL

[76] Inventor: William W. Speer, 3333 Esters Rd., #1112, Irving, Tex. 75062

[21] Appl. No.: 254,828

[22] Filed: Oct. 7, 1988

[51] Int. Cl.$^4$ .......................... B60R 9/10; B60D 1/06
[52] U.S. Cl. .......................... 224/42.07; 224/42.03 B; 280/511
[58] Field of Search .................. 224/42.03 R, 42.03 B, 224/42.03 A, 42.04–42.06, 42.07, 42.08, 42.43, 42.44, 42.45 R; 280/402, 415 A, 415 R, 423 R, 424, 511–513, 760, 769, 504, 507, 514; 403/114, 115, 360, 383, 355, 356, 359

[56] References Cited

U.S. PATENT DOCUMENTS

| | | | |
|---|---|---|---|
| 3,650,546 | 3/1972 | Koenig | 280/423 R |
| 3,659,876 | 5/1972 | Melton | 280/423 R |
| 3,703,301 | 11/1972 | Randle | 280/423 R |
| 3,927,811 | 12/1975 | Nussbaum | 224/42.03 |
| 3,955,831 | 5/1976 | Whitchurch | 280/423 R |
| 4,291,893 | 9/1981 | Hansen | 280/507 |
| 4,299,341 | 11/1981 | Copeland et al. | 224/42.03 |
| 4,301,953 | 11/1981 | Abbott | 224/42.45 R |
| 4,319,766 | 3/1982 | Corteg et al. | 280/511 |
| 4,437,599 | 3/1984 | Jordening | 224/319 |
| 4,461,410 | 7/1984 | Tartaglia | 224/42.03 |
| 4,546,994 | 10/1985 | Taylor | 280/511 |
| 4,576,395 | 3/1986 | Longoria | 224/42.07 |
| 4,676,414 | 6/1987 | Deguevara | 224/42.03 |

FOREIGN PATENT DOCUMENTS 2175859 12/1986 United Kingdom ......... 224/42.03 R

Primary Examiner—Henry J. Recla
Assistant Examiner—J. Casimer Jacyna
Attorney, Agent, or Firm—Roy L. VanWinkle

[57] ABSTRACT

An article carrier for use with a trailer hitch ball wherein a tubular member deviced to fit the trailer hitch balls extended thereover to support the carrier. A latch pin is inserted to prevent the tubular member from coming off the ball. The tubular member is of non-circular construction to prevent the carrier from rotating relatively about the vertical axis of the hitch ball.

8 Claims, 1 Drawing Sheet

U.S. Patent     Feb. 20, 1990     4,901,896
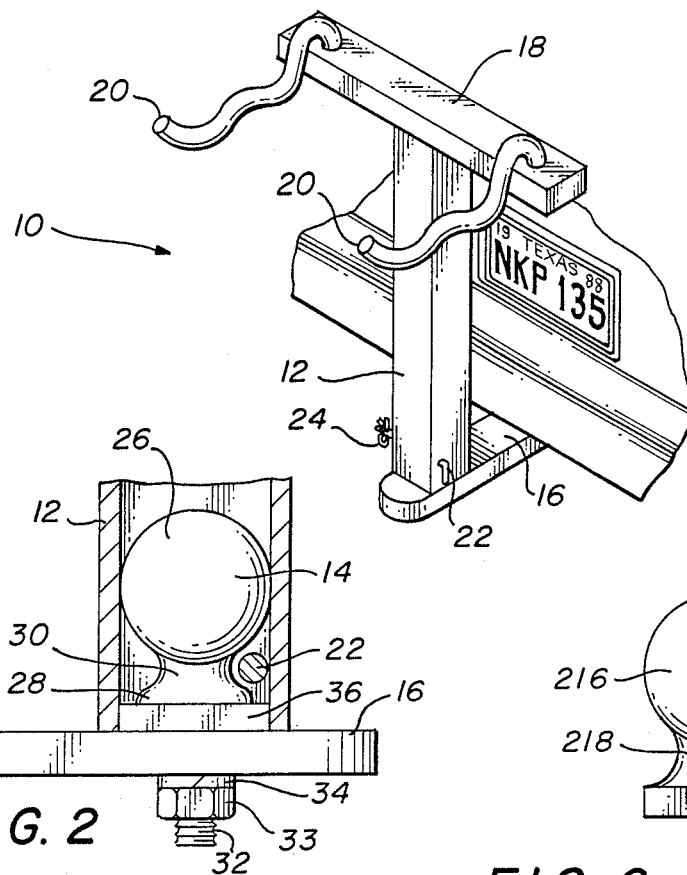
FIG. 1
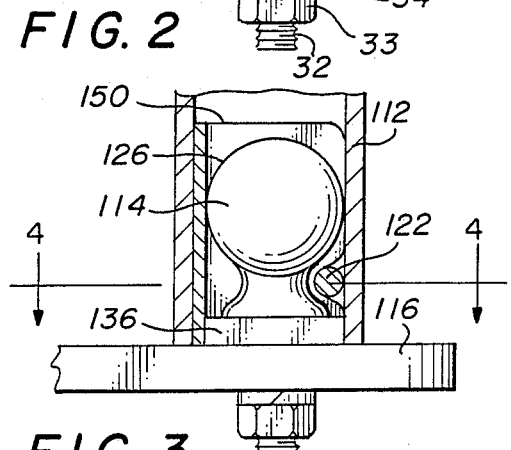
FIG. 2
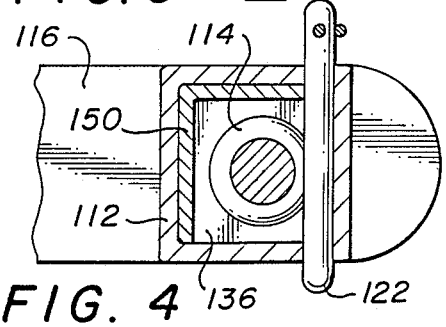
FIG. 3
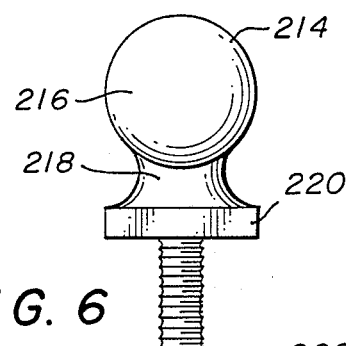
FIG. 6
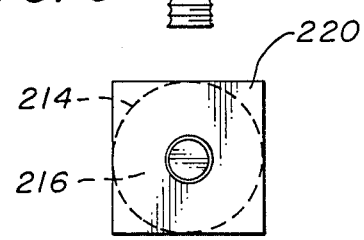
FIG. 7
FIG. 4
FIG. 5

APPARATUS FOR CONNECTING ARTICLE CARRIERS TO A TRAILER HITCH BALL

BACKGROUND OF THE INVENTION

This invention relates generally to apparatus for connecting article carries to a trailer hitch ball or the like. More particularly, but not by way of limitation, this invention relates to an article carrier including a tubular member sized to receive the hitch ball and means for releasably connecting the tubular member to the hitch ball.

Over the past several years it has become extremely desirable if not necessary, to be able to carry one or more bicycles, light motorcycles, wheel chairs, etc. on the exterior of a vehicle. Such carriers have included various types of structure for connecting the carrier to the trunk roof, and/or to the bumper of the vehicle. Other carriers have been connected to trailer hitches which extend ordinarily from the back of the vehicle underneath the rear bumper.

One example of such a carrier is illustrated in U.S. Pat. No. 4,461,410 issued July 24, 1984 to Paul Tartaglia. In this patent, the article carrier or bicycle rack is mounted on the draw bar of the trailer hitch by removing the ball and inserting a stud through the trailer hitch ball hole. Prevention of rotation of the carrier relative to the hitch and support is accomplished by means of a pair of bolts located on opposite sides of the trailer hitch draw bar.

A second article carrier is illustrated in U.S. Pat. No. 4,676,414 issued June 30, 1987 to Orlando Deguevara. In this patent, the article carrier is bolted to the end of a unique draw-bar which is inserted in a receiver that is mounted on the vehicle. Rotation of the carrier cannot occur due to the structure of the receiver type hitch.

While each of these carriers work satisfactory, it is necessary in the case of the carrier described in the '410 patent to remove the trailer hitch ball completely from the trailer hitch before the article carrier can be mounted thereon Removing the ball is, of course, extremely inconvenient In the carrier described in the '414 patent, it is necessary to have the article carrier connected to a unique removable draw bar which is expensive and somewhat inconvenient. Additionally, the carrier shown in the '414 patent cannot be used with hitches wherein the draw bar itself is mounted on the vehicle. For the most part, the receiver type hitches are not nearly as common as the standard draw bar type hitch wherein the draw bar is permanently mounted on the vehicle.

An object of this invention is to provide apparatus for connecting article carriers to a trailer hitch ball without the necessity for removing the ball and without the necessity for having the vehicle equipped with a receiver type hitch.

Another object of the invention is to provide an apparatus for connecting an article carrier to a trailer hitch ball quickly and easily and that can be constructed relatively inexpensively.

SUMMARY OF THE INVENTION

Accordingly, this invention provides apparatus for connecting article carriers, such as a bicycle carrier to a trailer hitch ball wherein the hitch ball includes a generally spherical top portion, a neck portion of reduced diameter and an enlarged base portion mounted on a draw bar. The carrier connecting apparatus comprises a tubular member forming part of the article carrier wherein the tubular member is sized to receive the hitch ball and, means for releasably connecting the tubular member to the hitch ball.

BRIEF DESCRIPTION OF THE DRAWING

The foregoing additional objects and advantages of the invention will become more apparent as the following detailed description is read in conjunction with the accompanying drawing wherein like reference characters denote like parts in all views and wherein:

FIG. 1 is a pictorial view of an article carrier constructed in accordance with the invention mounted on a draw bar of a trailer hitch.

FIG. 2 is an enlarged cross-sectional view of a portion of the article carrier showing its connection to the trailer hitch ball.

FIG. 3 is a view similar to FIG. 2 illustrating a modification of the invention.

FIG. 4 is transverse cross-sectional view taken generally along line 4—4 of FIG. 3.

FIG. 5 is a pictorial view of a shim utilized in the modification of FIG. 3.

FIG. 6 is a elevational view of a modified form of hitch ball that may be utilized in the invention.

FIG. 7 is a bottom view of the hitch ball of FIG. 6 clearly showing the modification.

DETAILED DESCRIPTION OF THE PREFERRED EMBODIMENT

Referring to the drawing and to FIG. 1 in particular, shown therein and generally designated by the reference character 10 is an article carrier constructed in accordance with the invention. As illustrated, the article carrier 10 includes a tubular member 12 that extends vertically over a trailer hitch ball 14 (see FIG. 2). The hitch ball 14 is mounted on a trailer hitch draw bar 16. The article carrier 10 also includes a horizontal member 18 having a pair of spaced outwardly projecting arms 20 for receiving an article such as a bicycle, wheel chair or the like.

The article carrier 10 is retained on the hitch ball 14 by a latch pin 22 that extends through aligned holes formed in the tubular member 12. The latch pin 22 is secured in position by a safety pin 24.

The hitch ball 14 also includes a stud portion 32 that extends through a hole formed in the draw bar 16. The hitch ball 14 is secured to the draw bar 16 by a lock nut 33 and washer 34 located on the stud portion 32 As clearly shown in FIG. 2, the latch pin 22 extends through the tubular member 12 adjacent to the neck portion 30 of the hitch ball 14 so that the tubular member 12 cannot be dislodged from the trailer hitch ball 14.

As shown in FIG. 2, a generally rectangular, spacer or washer member 36 is located between the base portion 28 of the hitch ball 14 and the top of the draw bar 16. The member 36 is configured to fit closely within the tubular member 12. If the tubular member 12 is rectangular configuration, the member 36 will also be a mating rectangle. The member 36 acts as an anti-rotation member when the tubular member 12 is disposed thereover so that the article carrier 10 cannot rotate about the vertical axis of the hitch ball 14. Additionally, the member 36 spaced from spherical portion 26 works with spherical portion 26 to hold tubular member 12 in the vertical position in alignment with the axis of the hitch ball.

As clearly illustrated in FIGS. 1-4, the tubular member 12 has an interior size that closely fits the spherical portion 26 of the hitch ball 14, encompasses the neck portion 30, the base portion 28 and the anti-rotation or washer member 36. Stated in another way, the tubular member 12 is telescoped over the hitch ball 14 and the anti-rotation member and rests on the draw bar 16.

While the tubular member 12 and member 36 have been illustrated as being generally rectangular in configuration, it should be apparent that if the tubular member were generally circular, a slot could be cut therein with a tab extending from the member 36 to engage the member 12 in the slot thus preventing rotation of the member 12 about the vertical axis of the trailer hitch ball 14. Any form of noncircular arrangement is satisfactory so long as it prevents rotation of the member 12 about the ball 14. The tubular member 12 is preferably of rectangular in cross-sectional configuration although it may be of any desired cross-sectional configuration so long as the cross-section is not circular.

OPERATION OF THE PREFERRED EMBODIMENT

Assuming that the carrier 10 is installed as illustrated in FIG. 1, all that is necessary to remove the carrier 10 from the vehicle is to remove the safety pin 24 and pull the latch pin 22 out of the tubular member 12. Once the pin 22 is removed, the tubular member 12 can be pulled upwardly, disengaging the carrier 10 from the trailer hitch ball 14. The article carrier 10 is then completely removed and the trailer hitch ball 14 remains intact for any other normal use of the trailer hitch.

To install the article carrier 10, it is necessary to place the tubular member 12 over the hitch ball 14 until the lower end thereof engages the draw bar 16, insert the latch pin 22 through the holes in the tubular member 12 and insert the safety pin 24 to prevent the latch pin 22 from coming out of the member 12. The carrier 10 is installed and read for use. The carrier 10 will remain vertical with the strong trailer hitch carrying the article load and cannot rotate due to the engagement between the tubular member 12 and the anti-rotation member 36.

From the foregoing, it can be seen that the article carrier 10 can be quickly and easily installed and removed without the necessity and difficulty of removing the trailer hitch ball from the draw bar, that the article carrier can be used whether the draw bar 16 is of the type that fits into the receiver or whether the draw bar 16 is permanently mounted on the vehicle, and that the trailer hitch remains available for normal use when the carrier 10 is removed therefrom.

MODIFICATION OF THE FIG. 3

The most common trailer hitch ball sizes in use in the United States, that is, for personal trailers and the like, are the two inch ball and the one and seven/eighths inch diameter ball. As illustrated in FIGS. 1 and 2 the article carrier 10 is designed to operate with either size of ball. However, if the tubular member 12 is sized to fit the one and seven/eighths ball it is obvious that it could not fit over a two inch ball.

FIGS. 3, 4, and 5, illustrate a tubular member 112 that has been selected to fit over a two inch ball. However, the modification permits use of the member 112 on a one and seven/eighths inch ball 114 installed on the draw bar 116. A gap of approximately 1/16th of an inch will be present between the outer diameter of the spherical portion 126 of the ball 114 the anti-rotation member 136, and the interior wall of the tubular member 112 without the modification.

As may be seen clearly in FIG. 5, a shim 150 has been manufactured from one eighth inch thick material having a 90° bend 152 therein. The shim 150 is provided with a notch 154 for receiving a latch pin 122 when the shim 150 is installed as can be seen in FIG. 3.

As shown in FIGS. 3 and 4, the shim 150 is located between the hitch ball 114 the anti-rotation member 136, and the interior wall of the tubular member 112 filling the gaps therebetween and making the hitch ball 114 and member 136 apparently fit closely within the tubular member 112 thus retaining the article carrier in the vertical position.

Rotation of the member 112 is prevented due to the engagement of the member 112 with a spacer or washer member 136. The member 136 is located between the ball 114 and the draw bar 116 as previously described in connection with the ball 14, member 36, and draw bar 16.

The modification as described in FIG. 3 is connected and disconnected in the same manner as was the article carrier 10 of FIGS. 1 and 2, except that the shim 150 must be placed in position prior to insertion of the tubular member 112 over the hitch ball 114.

HITCH BALL MODIFICATION

Trailer hitch balls normally have spherical upper portions as illustrated with base portions that are generally circular in cross-section It would be possible to eliminate the necessity for the anti-rotation members 36 shown in FIG. 2, and 136, shown in FIGS. 3 and 4, by a modification of the hitch ball.

In lieu of manufacturing the hitch ball with a circular base portion, a hitch ball 214 is constructed having a spherical upper portion 216, a neck portion of reduced diameter 218, and a base portion 220 of rectangular cross-section The rectangular cross-section of the base portion can be more easily seen in FIG. 7 and, as shown therein the rectangular base portion 220 has base and height dimensions that are at least equal to the outer diameter of the spherical upper portion 216 and of necessary height to prevent rotation.

It can be seen then that use of the ball 214 located on a draw bar will have the base portion 220 configured to mate with the interior of a rectangular tubular member. Accordingly the necessity for a separate anti-rotation member, such as the members 36 or 136, is eliminated.

Although not illustrated, it will be appreciated that if the hitch ball 214 were substituted for the hitch ball 26 in the FIG. 2 illustration, the rectangular base portion 220 would just fit within the inner dimensions of the tubular member 12. In this case, the tubular member 12 would fit in telescoping relationship over the spherical upper portion 16, the neck 218 and over the base portion 220.

From the foregoing, it can be appreciated that the article carrier as described herein can be quickly and easily mounted and dismounted from the trailer hitch of a vehicle, used without modification to the trailer hitch, and permits use of the railer hitch in its normal manner when the carrier is removed therefrom.

It will be understood that the foregoing detailed description is presented by way of example only and than many changes and modifications can be made thereto without departing from the spirit or scope of the invention.

What is claimed is:

1. Apparatus for connecting article carriers, such as a bicycle carrier to a trailer hitch ball wherein the hitch ball includes a generally spherical top portion, a neck portion of reduced diameter and an enlarged base portion mounted on a draw bar, the apparatus comprising:
  a tubular member of non-circular cross section sized to receive the hitch ball;
  means for releasably connecting said tubular member to the hitch ball; and,
  means for preventing movement between the hitch ball and the tubular member, said means for preventing movement including a member mounted between the base of the hitch ball and the draw bar, said member matingly engaging the non-circular cross section to retain the tubular member in alignment with the axis of the hitch ball and to prevent rotation of the tubular member.

2. The apparatus of claim 1 wherein:
  said tubular member has a generally rectangular cross-section; and, wherein
  said anti-rotation member has a conforming, generally rectangular cross-section.

3. Apparatus for connecting articles carriers, such as a bicycle carrier to a trailer hitch ball wherein the hitch ball includes a generally spherical top portion, a neck portion of reduced diameter and an enlarged base portion mounted on a draw bar, the apparatus comprising:
  a tubular member of non-circular cross section sized to receive the hitch ball;
  means for releasably connecting said tubular member to the hitch ball, said means for releasably connecting including a hole extending laterally through said tubular member adjacent to the neck portion of the hitch ball when the tubular member is located on the hitch ball and an elongated latch pin sized to fit said hole and extend through said tubular member adjacent to the neck portion; and
  means for preventing movement between the hitch ball and tubular member, said means for preventing movement including a member mounted between the base of the hitch ball and the draw bar, said member matingly engaging the non-circular cross-section to retain the tubular member in alignment with the axis of the hitch ball and to prevent rotation of the tubular member.

4. The apparatus of claim 1 wherein:
  said tubular member has a generally rectangular cross-section; and, wherein
  said anti-rotation member has a conforming, generally rectangular cross-section.

5. Apparatus for connecting article carriers, such as a bicycle carrier to a trailer hitch ball wherein the hitch ball includes a generally spherically top portion, a neck portion of reduced diameter and an enlarged base portion of non-circular cross-section mounted on a draw bar, the apparatus comprising:
  a tubular member of non-circular cross-section having an interior dimension to closely receive in telescoping relationship the top, and non-circular base portions of said hitch ball to prevent rotation of said tubular member relative to the hitch ball;
  means for releasably connecting said tubular member to the hitch ball; and,
  means for preventing vertical movement between the hitch ball and tubular member.

6. The apparatus of claim 5 wherein said means for releasably connecting said tubular member and hitch 7. Apparatus for connecting article carriers, such as a bicycle carrier, to a trailer hitch ball therein the hitch ball includes a generally spherically top portion and is selected from different diameters, a neck portion of reduced diameter and enlarged base portion mounted on a draw board, the apparatus comprising:
  a tubular member of rectangular cross section and sized to receive a hitch ball having a selected diameter equal to a less than the interior dimensions of said tubular member;
  means for releasably connecting said tubular member to the hitch ball; and,
  a shim member having a thickness equal to the difference between the interior dimensions of the tubular member and a selected hitch ball and a first portion disposed between the hitch ball and said tubualar member, and a second portion extending perpendicular from said first portion and also disposed between the hitch ball and tubular member, whereby said tubular member is adjustable to closely fit hitch balls of different sizes.

8. The apparatus of claim 7 wherein said second portion is engageable with said latch pin for retaining said shim member between the hitch ball and tubular member.

* * * * *

UNITED STATES PATENT AND TRADEMARK OFFICE
CERTIFICATE OF CORRECTION

PATENT NO.  : 4,901,896

DATED       : February 20, 1990

INVENTOR(S) : William W. Speer

It is certified that error appears in the above-identified patent and that said Letters Patent is hereby corrected as shown below:

Column 6:

Claim 6, line 2, after "hitch" insert --ball includes:
    a hole extending laterally through said tubular member
        adjacent to the neck portion of the hitch ball
        when the tubular member is located on the
        hitch ball; and,
    an elongated latch pin sized to fit said hole and
        to extend through said tubular member
        adjacent to the neck portion.--

Claim 7, line 9, change "a" to --or--.

Signed and Sealed this

Twentieth Day of August, 1991

Attest:

HARRY F. MANBECK, JR.

*Attesting Officer*     *Commissioner of Patents and Trademarks*